US008223687B2

(12) United States Patent
Cheever et al.

(10) Patent No.: US 8,223,687 B2
(45) Date of Patent: Jul. 17, 2012

(54) METHOD FOR PROVIDING HOME AGENT GEOGRAPHIC REDUNDANCY VIA A SERVICE REDUNDANCY PROTOCOL

(75) Inventors: Greg Cheever, Hampstead, NH (US); Sanil Kumar Puthiyandyil, Nashua, NH (US); Rajesh Ramankutty, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 163 days.

(21) Appl. No.: 11/286,050

(22) Filed: Nov. 23, 2005

(65) Prior Publication Data
US 2007/0116020 A1    May 24, 2007

(51) Int. Cl.
*H04W 4/00* (2009.01)
(52) U.S. Cl. .... 370/328; 370/224; 370/338; 370/395.52
(58) Field of Classification Search .................. 370/331, 370/338, 395.52; 455/435.1
See application file for complete search history.

(56) References Cited

U.S. PATENT DOCUMENTS

| 6,195,705 | B1  |    2/2001 | Leung |  |
|---|---|---|---|---|
| 6,487,605 | B1  |   11/2002 | Leung |  |
| 6,621,810 | B1  |    9/2003 | Leung |  |
| 6,771,623 | B2* |    8/2004 | Ton ................................ | 370/331 |
| 6,795,705 | B1  |    9/2004 | Warrier et al. |  |
| 6,799,204 | B1* |    9/2004 | Baba et al. ..................... | 709/220 |
| 7,080,151 | B1  |    7/2006 | Borella et al. |  |
| 7,173,917 | B1* |    2/2007 | Narayanan et al. ............ | 370/331 |
| 7,227,863 | B1  |    6/2007 | Leung et al. |  |
| 7,340,169 | B2* |    3/2008 | Ovadia et al. .................. | 398/57 |
| 7,457,882 | B2  |   11/2008 | Stewart et al. |  |
| 7,827,307 | B2* |   11/2010 | Lehrschall et al. ............ | 709/239 |
| 2001/0021175 | A1* |    9/2001 | Haverinen ..................... | 370/230 |
| 2002/0010865 | A1* |    1/2002 | Fulton et al. .................. | 713/201 |
| 2002/0067704 | A1  |    6/2002 | Ton |  |
| 2002/0080752 | A1* |    6/2002 | Johansson et al. ............. | 370/338 |

(Continued)

FOREIGN PATENT DOCUMENTS

EP    1 783 979    5/2007

(Continued)

OTHER PUBLICATIONS

International Search Report and Written Opinion issued for International Patent Application No. PCT/US2006/045326.

(Continued)

*Primary Examiner* — Rafael Pérez-Gutiérrez
*Assistant Examiner* — Liton Miah
(74) *Attorney, Agent, or Firm* — Wilmer Cutler Pickering Hale and Dorr LLP (57) ABSTRACT

Methods and systems for providing redundancy in servicing packet data communications within wireless mobile data networks are disclosed. More particularly, the method and system provide a redundant Home Agent with the ability to assume the role of the primary Home Agent in the event of a primary Home Agent network, software, or other failure. The redundancy allows the Home Agent services to remain functional even in the event of a failure of one of the Home Agents in the redundant group, which may be composed of one or more Home Agents. The Home Agents can use a service redundancy protocol which is composed of messages that are sent between the redundant group of Home Agents. The messages allow the Home Agents to, for example, back up call session information, check on the status of one another, and share priority information.

18 Claims, 11 Drawing Sheets

U.S. PATENT DOCUMENTS

| | | | |
|---|---|---|---|
| 2002/0165944 A1* | 11/2002 | Wisner et al. | 709/220 |
| 2003/0073439 A1* | 4/2003 | Wenzel et al. | 455/435 |
| 2003/0182433 A1* | 9/2003 | Kulkarni et al. | 709/228 |
| 2004/0066749 A1 | 4/2004 | Watanabe | |
| 2004/0090941 A1* | 5/2004 | Faccin et al. | 370/338 |
| 2004/0095881 A1 | 5/2004 | Borella et al. | |
| 2004/0202126 A1 | 10/2004 | Leung et al. | |
| 2005/0207382 A1 | 9/2005 | Hirashima et al. | |
| 2005/0207429 A1 | 9/2005 | Akita et al. | |
| 2006/0174039 A1 | 8/2006 | Stewart et al. | |
| 2007/0066273 A1 | 3/2007 | Laroia et al. | |
| 2007/0066329 A1 | 3/2007 | Laroia et al. | |
| 2007/0165516 A1 | 7/2007 | Xu et al. | |
| 2007/0245167 A1 | 10/2007 | De La Cruz et al. | |

FOREIGN PATENT DOCUMENTS

| | | |
|---|---|---|
| WO | WO-00/45560 | 8/2000 |
| WO | WO-03/085540 | 10/2003 |

OTHER PUBLICATIONS

File History for U.S. Appl. No. 11/286,049, Nov. 22, 2006.
File History for U.S. Appl. No. 11/731,920, Nov. 23, 2005.

* cited by examiner

METHOD FOR PROVIDING HOME AGENT GEOGRAPHIC REDUNDANCY VIA A SERVICE REDUNDANCY PROTOCOL

BACKGROUND OF THE INVENTION

The present invention relates to servicing calls in wireless mobile data networks. More particularly, this invention relates to providing redundancy in the servicing of packet data communications by Home Agents within wireless mobile data networks.

Wireless networks provide users with data without the need for a wired line tethering the user to a certain location. A wireless network is typically composed of a mobile device, base stations, and a supporting infrastructure. The mobile device can be, for example, a cell phone, a PDA, or a computer with wireless capabilities. These mobile devices interact with base stations that transmit and receive data. The base stations can further be connected to a network infrastructure that connects to the public switched telephone network (PSTN), the Internet, and/or other communication networks.

While cellular wireless communication systems were originally designed to transmit voice communications, increasingly these networks have been modified to also support data communications, such as packet based data communications. Mobile IP, a form of packet based data communication, enables mobile devices to change where they are connecting to the Internet without changing their Internet protocol (IP) address. Various agents assist in the transmission of packets from a mobile device to the Internet. A Home Agent performs the mobility management functions needed for IP communications on behalf of the mobile device. Mobile devices get the Home Agent address either through a static configuration, where the IP address of the Home Agent is hard-coded in the mobile device, or through a mobile IP registration process.

When a registration process is used, a server is responsible for assigning Home Agents to mobile devices. In either the static assignment or the server registration of a mobile device with a Home Agent, it is important that the assigned Home Agent is fully functional. Therefore, it is highly desirable to provide redundancy so that a fully functionally Home Agent is always available for a mobile device.

SUMMARY OF THE INVENTION

In accordance with the present invention, techniques and systems for providing redundancy in the servicing of packet data communications within wireless mobile data networks are provided. More particularly, techniques and systems where a first Home Agent can initiate a switchover to a second Home Agent to service existing and future packet data communications on a network are provided.

Thus, in accordance with the present invention, certain embodiments feature a first Home Agent acting as a primary Home Agent, a second Home Agent communicating with the first Home Agent, a communication link coupling the first and second Home Agent, the first Home Agent sending a Hello Message to the second Home Agent, the Hello Message containing system attributes, the first Home Agent sending a Service Checkpoint Message to the second Home Agent which provides information used to perform as the primary Home Agent, and the second Home Agent able, in response to at least one of the Hello Message and the Service Checkpoint Message, to transition to become the primary Home Agent.

Further in accordance with the present invention, certain embodiments feature a method for sending a Hello Message containing system attributes from a first Home Agent to a second Home Agent, sending a Service Checkpoint Message from the first Home Agent acting as a primary Home Agent to the second Home Agent, wherein the Service Checkpoint Message contains information used to perform as the primary Home Agent, and transitioning the second Home Agent to the primary Home Agent.

Still further in accordance with the present invention, certain embodiments feature a first mechanism for providing a primary Home Agent, a second mechanism for providing a second Home Agent, a mechanism for communicating between the first means and the second mechanism, the first mechanism sending a Hello Message to the second mechanism, the Hello Message containing system attributes, and the first mechanism sending a Service Checkpoint Message to the second mechanism providing information used to perform as the primary Home Agent, wherein the second mechanism transitions to become the primary Home Agent.

BRIEF DESCRIPTION OF THE DRAWINGS

The above and other advantages of the present invention will be apparent upon consideration of the following detailed description, taken in conjunction with accompanying drawings, in which like reference characters refer to like parts throughout, and in which.

DETAILED DESCRIPTION OF THE INVENTION

In accordance with the present invention, systems and techniques for providing redundancy in the servicing of packet data communications within wireless mobile data networks are disclosed. More particularly, this invention proposes a technique for providing a redundant Home Agent with the ability to assume the role of the primary Home Agent in the event of a primary Home Agent network or software failure. The redundancy allows the Home Agent services to remain functional even in the event of a failure of one of the Home Agents in the redundant group, which may be composed of one or more Home Agents. The Home Agents can be located in geographically separate areas to ensure that a network outage event in one geographic area does not cause subscriber services to be impacted in another area.

Figure 1:
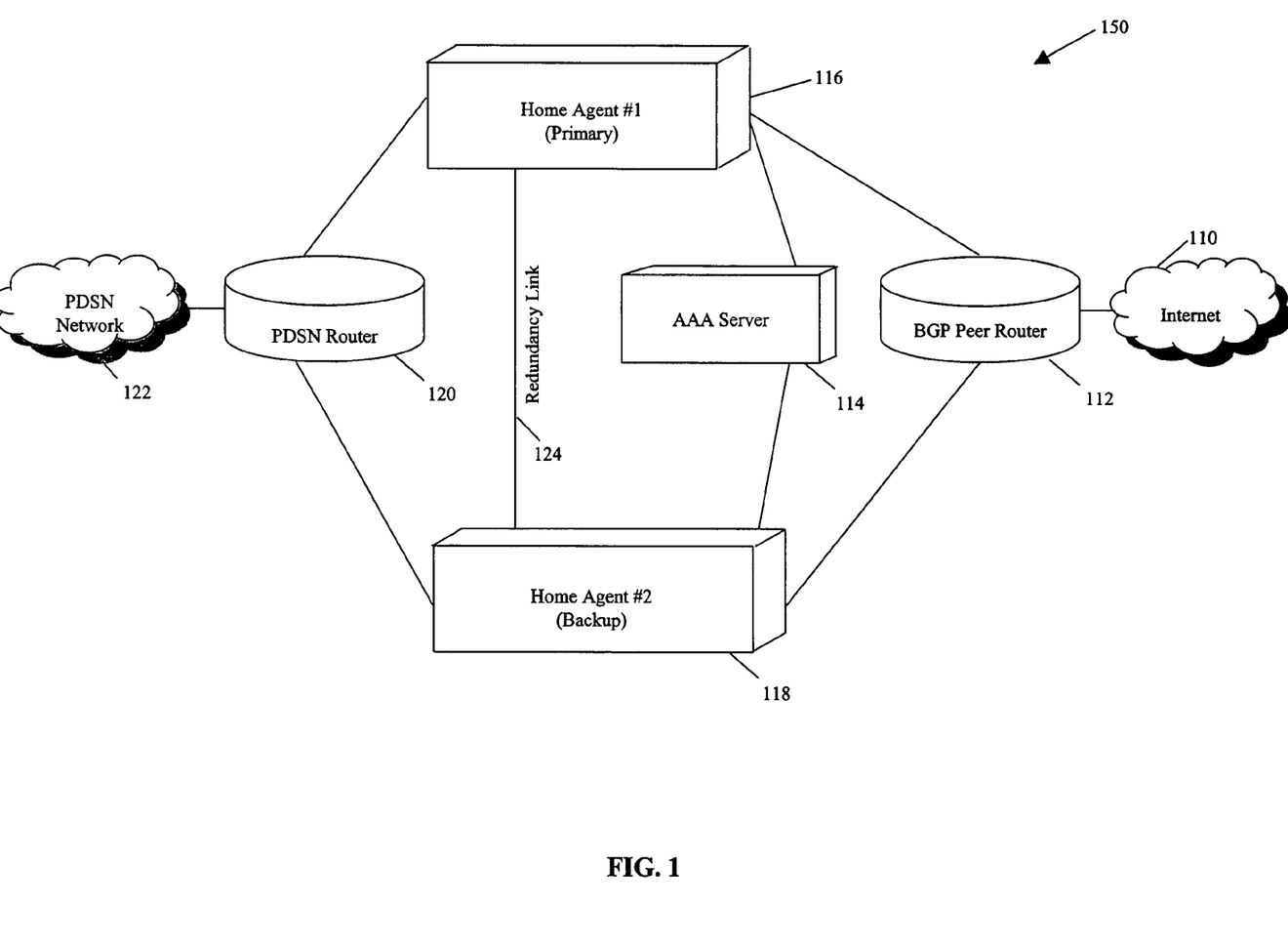
FIG. 1 is a schematic diagram of a network that is capable of transmitting data in accordance with certain embodiments of the present invention.

FIG. 1 illustrates a system 150 that composes a network diagram in accordance with certain embodiments of the present invention. Illustrated system 150 contains Internet 110, a Border Gateway Protocol (BGP) Router 112, an Authentication, Authorization, and Accounting (AAA) Server 114, a Home Agent (HA#1) 116, a Home Agent (HA#2) 118, a Packet Data Switched Network (PDSN) Router 120, a PDSN Network 122, and a redundancy link 124. As may be appreciated by one skilled in the art, system 150 may contain additional Routers, Home Agents, and Servers as is needed in a network to provide the level of service desired. Generally speaking, BGP is a system routing protocol that is commonly used to exchange routing information for the Internet between Internet service providers. BGP Router 112 may be used to propagate Internet Protocol (IP) information throughout the routing domain and Internet 110.

As illustrated, AAA Server 114 can interact with HA#1 116 and HA#2 118 to handle mobile device requests for access to network resources. In some embodiments, AAA Server 114 communicates with a Remote Authentication Dial-In User Service (RADIUS) Server to authenticate and authorize access to system resources. Illustrated HA#1 116 is the primary Home Agent and actively handles IP communications, while HA#2 118 is a backup Home Agent. As shown, HA#1 116 and HA#2 118 are connected by a redundancy link 124 that provides a channel for passing information and allows the two Home Agents to switch states. The two Home Agents, HA#1 116 and HA#2 118, are connected to PDSN Router 120. PDSN Router 120 may forward data packets through PDSN Network 122 and eventually to the mobile device requesting the data.

In certain embodiments of the present invention, a pair of Home Agents may be configured in a primary/backup configuration. In FIG. 1, the primary Home Agent, HA#1 116, can provide Home Agent services during normal operating conditions. Likewise, the backup Home Agent, HA#2 118, can provide Home Agent services during failure conditions. When a Home Agent is providing services it is considered "Active," and when the Home Agent is not providing services it is considered "Standby." An inter-Home-Agent communication channel, for example redundancy link 124, may be used to allow the Home Agents to communicate to determine the state of the Home Agents. The Home Agents may also communicate by sending packets to one another through the existing network infrastructure. In some embodiments of the invention, the "Standby" Home Agent may not switch to "Active" unless a failure is detected. In other embodiments, the Home Agents may switched manually for performing, for example, maintenance or upgrades to one of the Home Agents.

In some embodiments of the present invention, the service redundancy protocol used by the Home Agents is a networking protocol based on a transfer control protocol (TCP) that can provide a communication channel between a primary and a backup Home Agent. The communication channel may allow the Home Agents to determine the peer Home Agent state, to validate peer Home Agent configuration, and to synchronize subscriber session information. In certain embodiments, a service redundancy protocol (SRP) can be implemented as a centralized control/distributed session model with a SRP-Manager handling various aspects of the communication. The SRP-Manager can be a single hardware or software process that reads incoming and forms outgoing SRP control messages including a Hello message and various configuration validation messages. The SRP-Manager can also be responsible for determining the Active/Standby state of the Home Agent.

In some embodiments, multiple processes called SRP-Session Managers act as distributed agents and communicate subscriber session information to the redundant Home Agent peer. The peer SRP-Session Managers on the redundant Home Agent may be responsible for receiving this information and creating a redundant session for use in the event of a switchover. The SRP-Manager can communicate Home Agent state and SRP protocol configuration information to the SRP-Session Managers. This information can provide each SRP-Session Manager with the ability to contact the remote Home Agent and synchronize the current subscriber sessions through the use of service checkpoint messages.

In certain embodiments of the present invention, SRP Hello Messages are sent by both Home Agents in a redundant grouping. These messages may be sent at a periodic interval, randomly, or based on conditions configured by an administrator. The Hello Messages can be used to determine the state of the remote Home Agent and to verify communication with the remote Home Agent. In some embodiments, if the Standby Home Agent has not received a valid SRP Hello Message from its peer within a dead-interval, the Home Agent can assume the Active Home Agent is not functioning, and can transition to Active and begin processing subscriber sessions.

The Hello Message may contain system attributes such as: Home Agent state, Peer State, Peer Role, Hello Interval, Priority, Priority Tiebreaker, and BGP modifier. The attributes may be appended to a TCP header and the attributes may be sized in terms of bits, and meanings can be assigned to bit combinations according the needs of the network. The Home Agent state can be the current state of the Home Agent sending the message. The Peer State can be the last known state of a peer Home Agent. The Peer Role can be the role configured for the Home Agent (e.g., primary, backup, etc.). The Hello Interval can be a user-set time period between adjacently sent Hello Messages. The Priority can be a weight assigned to a Home Agent for use in operation. The Priority Tiebreaker can be a second attribute used to determine which Home Agent should transition to Active in the case of identical priority. The BGP modifier can be an attribute used to determine how to route messages from BGP router 112.

In some embodiments of the present invention, there are SRP Configuration Validation Messages. The Active Home Agent sends the SRP Configuration Validation Message to the Standby Home Agent. These messages may contain configuration information that allows the Standby Home Agent to determine if it is properly configured to assume the role of Active Home Agent. The SRP Configuration Validation Message may allow for configuration error checking, and verification that the peer Home Agent is compatible. If an error is determined to exist, the Standby Home Agent can produce an alarm so that the network operator is notified of the potential problem. The Home Agent may also maintain a configuration conflict notification mechanism to identify potential problems between peer Home Agents to an operator before a switching event occurs.

The SRP Configuration Validation Messages may contain attributes such as: Message Type, Home Agent Configuration, and Home Agent State. The Message Type can be the category of configuration message. Some examples of categories of configuration messages are loopback interface configuration, IP pool configuration, Home Agent Service IP Address, Home Agent Service configuration, and Home Agent Authentication, Authorization, and Accounting (AAA) probe configuration. The Home Agent Configuration can be the configuration parameters for the selected category of message. The Home Agent State can be the current state of the Home Agent sending the message.

In certain embodiments of the present invention, there are SRP Service Checkpoint Messages. The Checkpoint Messages contain data that may describe each subscriber session being processed by the Active Home Agent and can contain fields to indicate which session the data pertains and whether to overwrite a session already stored on the Standby Home Agent. The Checkpoint Messages can create/delete redundant sessions on the Standby Home Agent. The messages can also periodically update subscriber session statistics on the Standby Home Agent. The Checkpoint Messages may contain all the information needed to recreate a call on the Standby Home Agent if the Standby Home Agent were to transition to an Active Home Agent. Another Checkpoint Message may be used to invalidate an existing session (i.e., this message is sent to the Standby Home Agent when a call is terminated on the Active Home Agent).

In some embodiments, the primary and backup Home Agents, illustrated HA#1 116 and HA#2 118 respectively, are configured with common loopback interface routes and IP Pool information. The Home Agent services run on these loopback interface routes. The loopback routes may be advertised throughout the IP routing domain, in certain embodiments, through the use of a dynamic routing protocol on the Active Home Agent. In the event of a failure, for example, the Standby Home Agent transitions to Active and begins advertising the loopback and IP Pool routes of the formerly Active Home Agent. This may allow other elements in the network to transition to communicating with the previously Standby Home Agent without service interruption.

In order to preserve existing subscriber sessions during a switchover event, in certain embodiments, the Home Agents send messages to each other during operation. The messages may allow the Standby Home Agent to resume a session in the event that the Home Agent transitions to Active. In some embodiments, the Active Home Agent may monitor the following items to detect a possible failure: 1) dynamic routing peer connectivity; 2) AAA server connectivity; 3) Standby Home Agent connectivity; 4) internal software state. In the event one of these items fails, the Active Home Agent may initiate a switchover event allowing the Standby Home Agent to transition to Active and avoid a service interruption to any existing or new subscribers.

Figure 2:
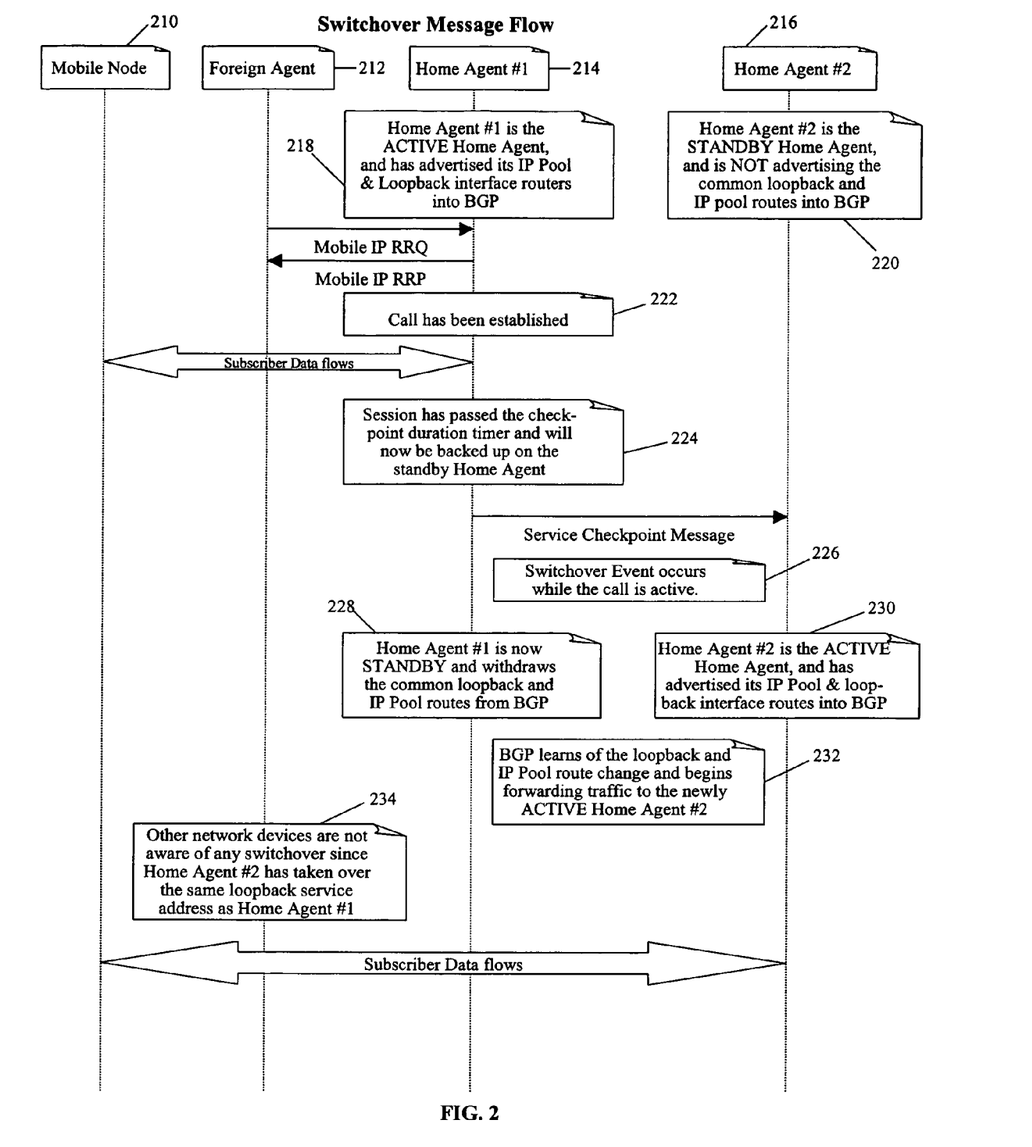
FIG. 2 is a schematic diagram illustrating switchover message flow in accordance with certain embodiments of the present invention.

FIG. 2 illustrates the interactions between a Mobile Node 210, a Foreign Agent 212, a Home Agent #1 214, and a Home Agent #2 216 in a switchover event in accordance with certain embodiments of the present invention. As shown in this example, Active Home Agent #1 214 advertises its IP Pool and loopback interface routes into the Border Gateway Protocol (BGP) router in step 218. Standby Home Agent #2 216 does not advertise the common loopback and IP pool routes to the BGP router in step 220. At some later point in time, Home Agent #1 214 receives a Mobile IP registration request from Foreign Agent 212. When Home Agent #1 214 replies to the request, a call is established in step 222. Subscriber data can then flow for some time from Mobile Node 210 to Home Agent #1 214.

According to some embodiments of the invention, data from Home Agent #1 214 is backed up on Home Agent #2 216 at certain times in step 224. The backup of information may occur because a preset duration timer has expired or because a predefined event triggers the backup. The backed-up information includes the data necessary to either continue a call, to recreate a call on another Home Agent, or to refresh any other ancillary data desired. If a switchover event occurs while a call is Active (in step 226), Home Agent #1 214 may revert to Standby withdrawing the common loopback and IP Pool routes from the BGP router in step 228. This allows Home Agent #2 216 to advertise its IP Pool and loopback routes to the BGP router in step 230. When the BGP router learns of the change, it begins forwarding traffic to Home Agent #2 216 in step 232 and the subscriber data begins flowing through Home Agent #2 216. Because Home Agent #1 214 and Home Agent #2 216 use a common loopback service address, other network devices may not be aware of any switchover in step 234.

Figure 3:
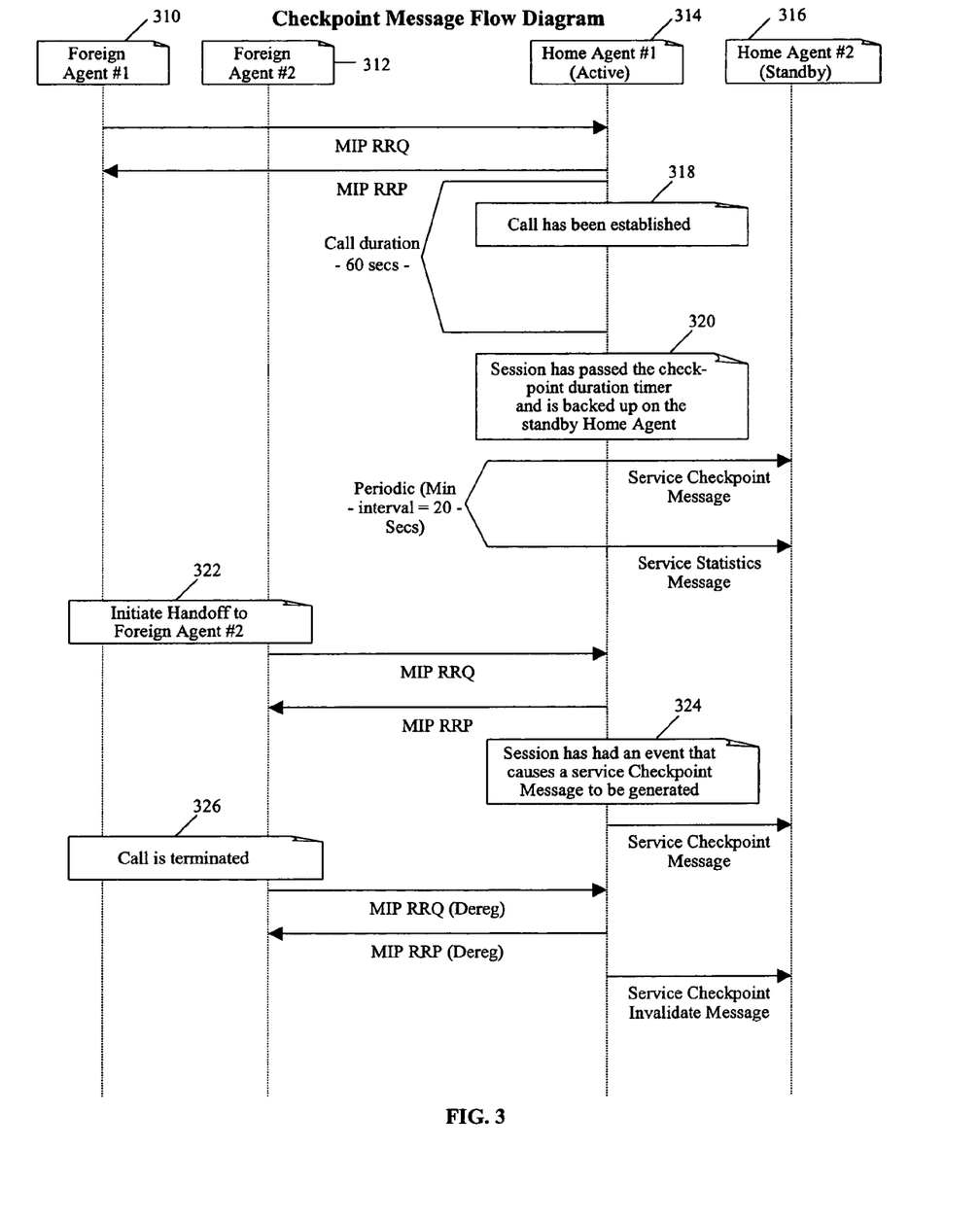
FIG. 3 is a schematic diagram illustrating checkpoint message flow in accordance with certain embodiments of the present invention.

FIG. 3 illustrates SRP Service Checkpoint Message flow in accordance with certain embodiments of the present invention. The message flow interactions involve a Foreign Agent #1 310, a Foreign Agent #2 312, a Home Agent #1 314, and a Home Agent #2 316. As shown, Home Agent #1 314 receives a Mobile IP registration request from Foreign Agent 310. In response, Home Agent #1 314 sends a Mobile IP registration reply to initiate a new session and a call is established 318. After the session passes the checkpoint defined duration timer, the session can be backed up on the Standby Home Agent in step 320. The checkpoint duration timer can be set to a value, such as 60 seconds, as shown in FIG. 3. Event 320 may include Home Agent 314 sending a Service Checkpoint Message and a Service Statistics Message to Home Agent #2 316. In some embodiments, a Service Checkpoint Message may be sent without a Service Statistics Message.

At some point in time, Foreign Agent #1 310 initiates a handoff to Foreign Agent #2 312 in step 322. Foreign Agent #1 310 may send a Mobile IP registration request to Home Agent 314 and Home Agent #1 314 may send back a Mobile IP registration reply. The handoff event 322 may trigger the generation of a Service Checkpoint Message in step 324 to update the information on the call for Home Agent #2 316. When the call is terminated in step 326 and Mobile IP deregistration request is sent to Home Agent #1 314, Home Agent #1 314 replies with a Mobile IP deregistration acknowledgement. Home Agent #1 314 may then send Home Agent #2 a Service Checkpoint Invalidate Message to prompt Home Agent #2 316 to remove the information for the call from its system. The Service Checkpoint Invalidate Message may ensure a terminated call is not reinstated possibly causing service disruptions or tying up network resources if Home Agent #2 316 transitions to an Active state.

Figure 4:
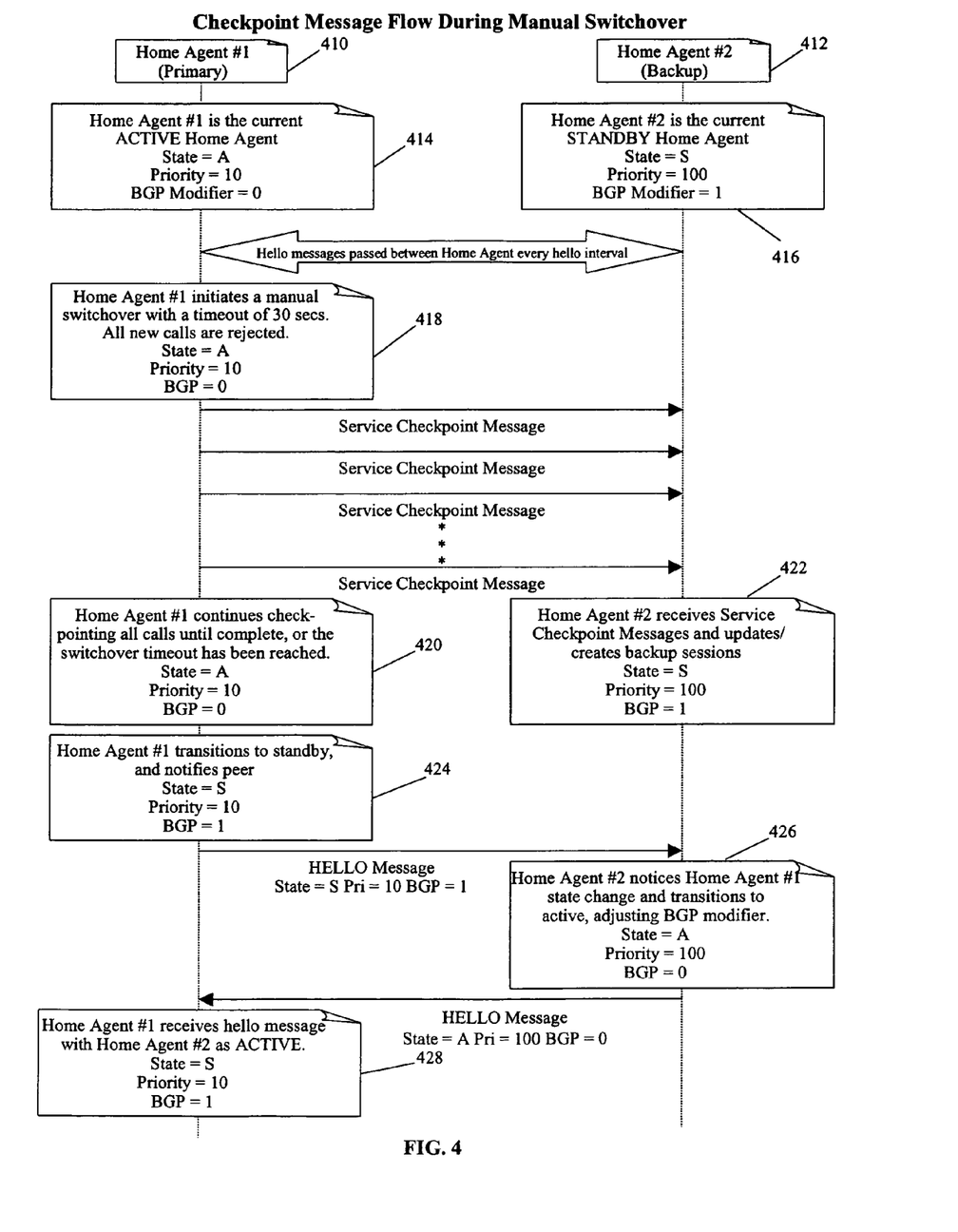
FIG. 4 is a schematic diagram illustrating a manual switchover in accordance with certain embodiments of the present invention.

FIG. 4 illustrates a manual switchover event involving a Home Agent #1 410 and a Home Agent #2 412 in accordance with certain embodiments of the invention. As shown in this example, Home Agent #1 410 is in an Active state with certain priority and BGP modifier attributes as highlighted in step 414. These attributes may be sent in a Hello Message to other Home Agents so the status of the various Home Agents on the network is known to each other. As shown, Home Agent #2 412 is in a Standby state and has a priority of 100 and a BGP modifier of 1 in step 416. In some embodiments, the Hello Messages contain routing attribute information for deciding Init state transitions.

When Home Agent #1 410 initiates a manual switchover event 418, new calls may be rerouted to Home Agent #2 412, sent to one or more other Home Agents (not shown), or rejected depending on the embodiment of the invention. As shown, Home Agent #1 410 sends Checkpoint Messages to pass backup information to Home Agent #2 412. In step 420, Home Agent #1 410 continues checking the calls it is handling until the calls are finished or a switchover timeout is reached. At about the same time, Home Agent #2 412 updates its information for the calls and refreshes its configuration settings from the backup information it is receiving from Home Agent #1 410 in step 422. When Home Agent #1 410 is no longer servicing any calls, it can transition to Standby and notify Home Agent #2 412 through a Hello Message in step 424 that it has done so. The Hello Message alerts Home Agent #2 412 that Home Agent #1 410 has changed states and Home Agent #2 412 transitions to an Active state in step 426. In certain embodiments, Home Agent #2 412 then sends a Hello Message to Home Agent #1 410 to indicate it is in the Active state in step 428.

Figure 5:
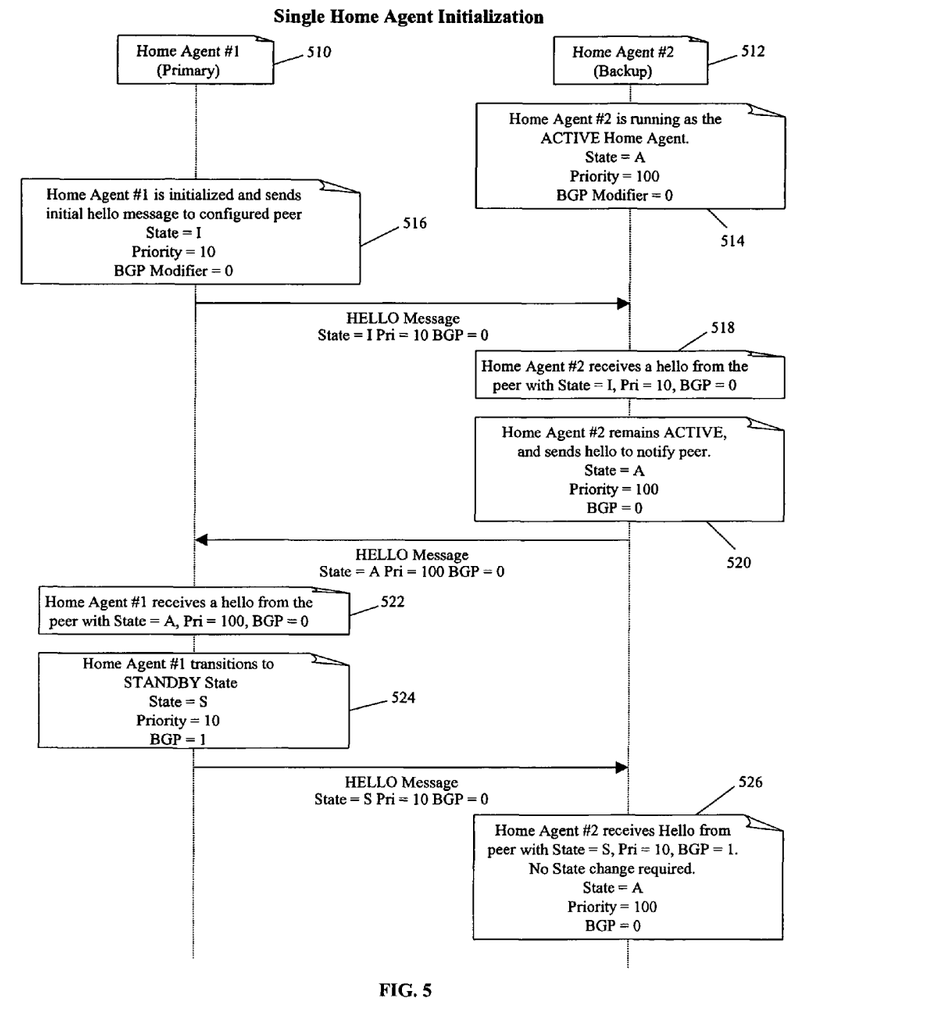
FIG. 5 is a schematic diagram illustrating a single Home Agent initialization in accordance with certain embodiments of the present invention.

FIG. 5 illustrates a single Home Agent initialization involving Home Agent #1 510 and Home Agent #2 512 in accordance with certain embodiments of the present invention. In this example, Home Agent #2 512 is running in the Active state in step 514 and Home Agent #1 510 comes online in an Init state. Home Agent #1 510 proceeds to send a Hello Message to Home Agent #2 512 in step 516. Home Agent #2 512 receives the Init Hello Message from Home Agent #1 510 containing state, priority, and BGP modifier information of Home Agent #1 510 in step 518. Home Agent #2 512, upon evaluating the Hello Message, remains Active and sends a Hello Message with its Active state to Home Agent #1 510 in step 520. Home Agent #1 510 receives the Hello Message in step 522, transitions to Standby, and based upon the Hello Message updates its BGP routing attribute from zero to one in step 524. At a later point in time, Home Agent #1 510 sends a Hello Message to Home Agent #2 512, but no state change is required in step 526. Home Agent #2 512 can remain Active and handling the calls because Home Agent #1 510 has confirmed it is in the Standby state.

Figure 6:
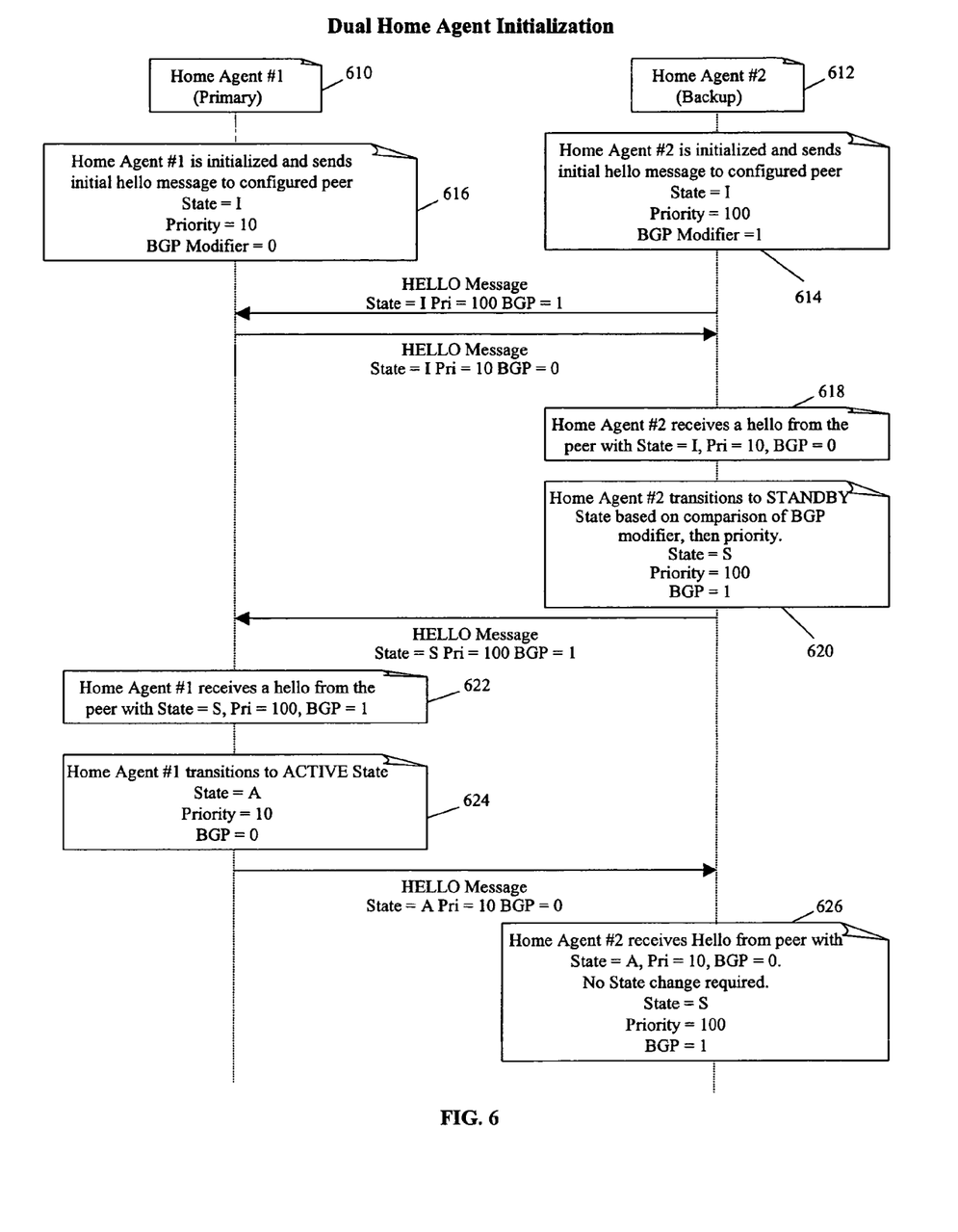
FIG. 6 is a schematic diagram illustrating a dual Home Agent initialization in accordance with certain embodiments of the present invention.

FIG. 6 illustrates a dual Home Agent initialization in accordance with certain embodiments of the present invention. As shown in this example, a Home Agent #1 610 and a Home Agent #2 612 are initialized upon coming online. Home Agent #1 610 and Home Agent #2 612 may then exchange Hello Messages with state, priority, and BGP modifier information in steps 614 and 616. Home Agent #2 612 receives the Hello Message from Home Agent #1 610 in step 618 and based on a comparison of one or more routing attributes, such as priority and BGP modifier, transitions to Standby in step 620. Home Agent #1 610 has a lower priority and BGP modifier than Home Agent #2 612. The BGP modifier may be used initially to determine which Home Agent should become Active and the priority may then be used if more than one Home Agent shares the same BGP modifier value.

As illustrated, after a comparison and transition, Home Agent #2 612 notifies Home Agent #1 610 of its Standby state. When Home Agent #1 610 receives notice of the Standby state of Home Agent #2 612 in step 622, it can transition to Active in step 624. In certain embodiments, Home Agent #1 610 remains in the Init state after the comparison of one or more routing attributes because the routing attribute rules do not specify that the Home Agent transition into Standby. In other embodiments, Home Agent #1 610 transitions to Active based on the comparison, and Home Agent #2 612 transitions to Standby after learning Home Agent #1 610 is Active. In still other embodiments, the Home Agents may transition based on the outcomes of the comparisons and then check the outcome with further Hello Messages. Upon receiving confirmation of the Active state from Home Agent #1 610, Home Agent #2 612 can remain in Standby state in step 626.

Figure 7:
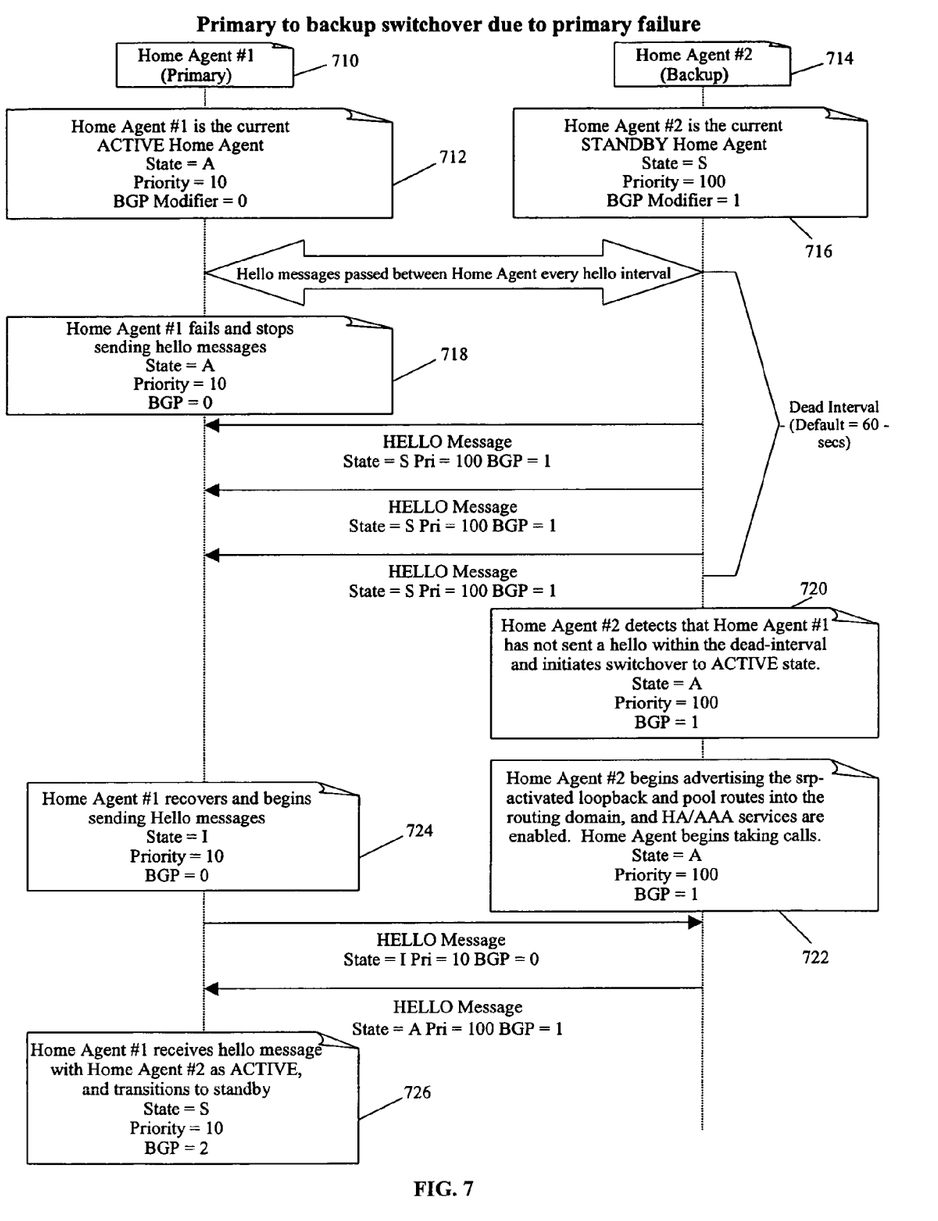
FIG. 7 is a schematic diagram illustrating a primary to backup switchover due to a primary failure in accordance with certain embodiments of the present invention.

FIG. 7 illustrates a primary Home Agent failing and the subsequent switchover to a backup Home Agent in accordance with certain embodiments of the present invention. As shown in this example, a Home Agent #1 710 is Active in step 712 and a Home Agent #2 714 is Standby in step 716 with Hello Messages being passed at regular intervals. At some point in time, Home Agent #1 710 fails and stops sending Hello Messages in step 718. After a specified dead-interval where Home Agent #2's Hello Messages go unanswered, Home Agent #2 714 initiates a switchover to an Active state 720. Upon transitioning to Active, Home Agent #2 714 begins advertising the loopback and IP pool routes to the routing domain in step 722. An Authentication, Authorization, and Accounting (AAA) Server (shown in FIG. 1 as 114) may enable services for Home Agent #2 714 so Home Agent #2 714 can then begin taking calls. At some later point in time, Home Agent #1 710 recovers and sends a Hello Message with an Init state to Home Agent #2 714 in step 724. Home Agent #1 710 receives the Hello Message from Home Agent #2 714 with an Active state. After evaluating the information received in the Hello Message, Home Agent #1 710 transitions to Standby and updates its BGP modifier to two in step 726. The new BGP modifier helps to determine how to route messages and may help establish which Home Agent is going to transition to Active.

Figure 8:
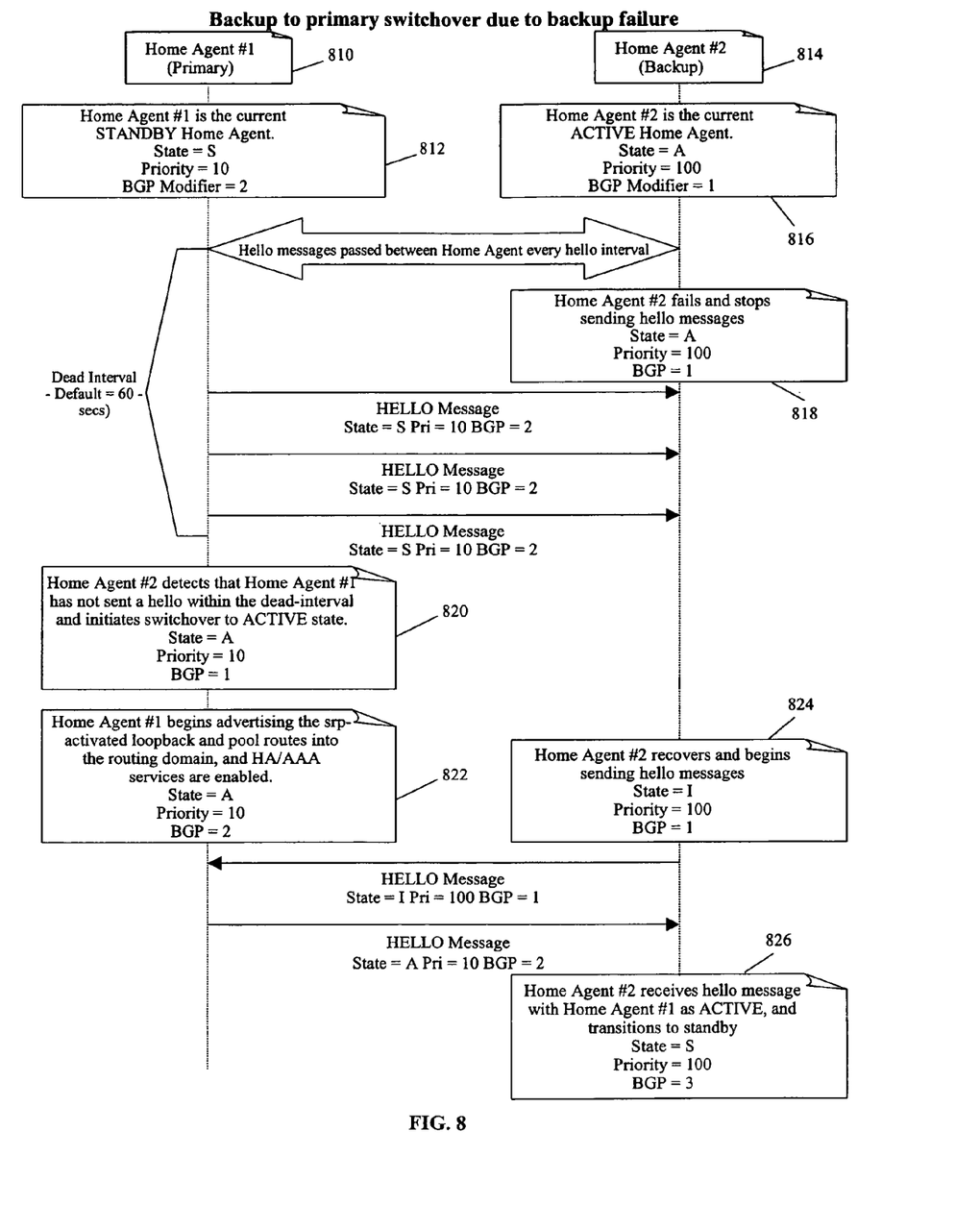
FIG. 8 is a schematic diagram illustrating a backup to primary switchover due to a backup failure in accordance with certain embodiments of the present invention.

FIG. 8 illustrates a backup Home Agent failing and the subsequent switchover to a primary Home Agent in accordance with certain embodiments of the present invention. FIG. 8 may be considered a continuation of the situation presented in FIG. 7. As shown in this example, a Home Agent #1 810 is in a Standby state in step 812 and a Home Agent #2 814 is in an Active state in step 816. Hello Messages may then be passed between the Home Agents at regular intervals. At some point in time, Home Agent #2 814 fails and stops sending Hello Messages in step 818. Home Agent #1 810 may continue sending Hello Messages until a specified dead-interval ends, at which point Home Agent #1 810 initiates a switchover to Active in step 820. Upon transitioning to Active, Home Agent #1 810 begins advertising the loopback and IP pool routes to the routing domain. Home Agent #1 810 may also establish contact with Authentication, Authorization, and Accounting (AAA) Server to enable call verification services. After advertising the loopback and IP pool routes and accessing the AAA server, Home Agent #1 810 can begin taking calls in step 822. At some later point in time, Home Agent #2 814 recovers and sends a Hello Message with an Init state in step 824. Home Agent #2 814 receives a Hello Message from Home Agent #1 810 with an Active state and Home Agent #2 814 transitions to Standby in step 826. Home Agent #2 also updates its BGP modifier to three after receiving the Hello Message from Home Agent #1 810.

Figure 9:
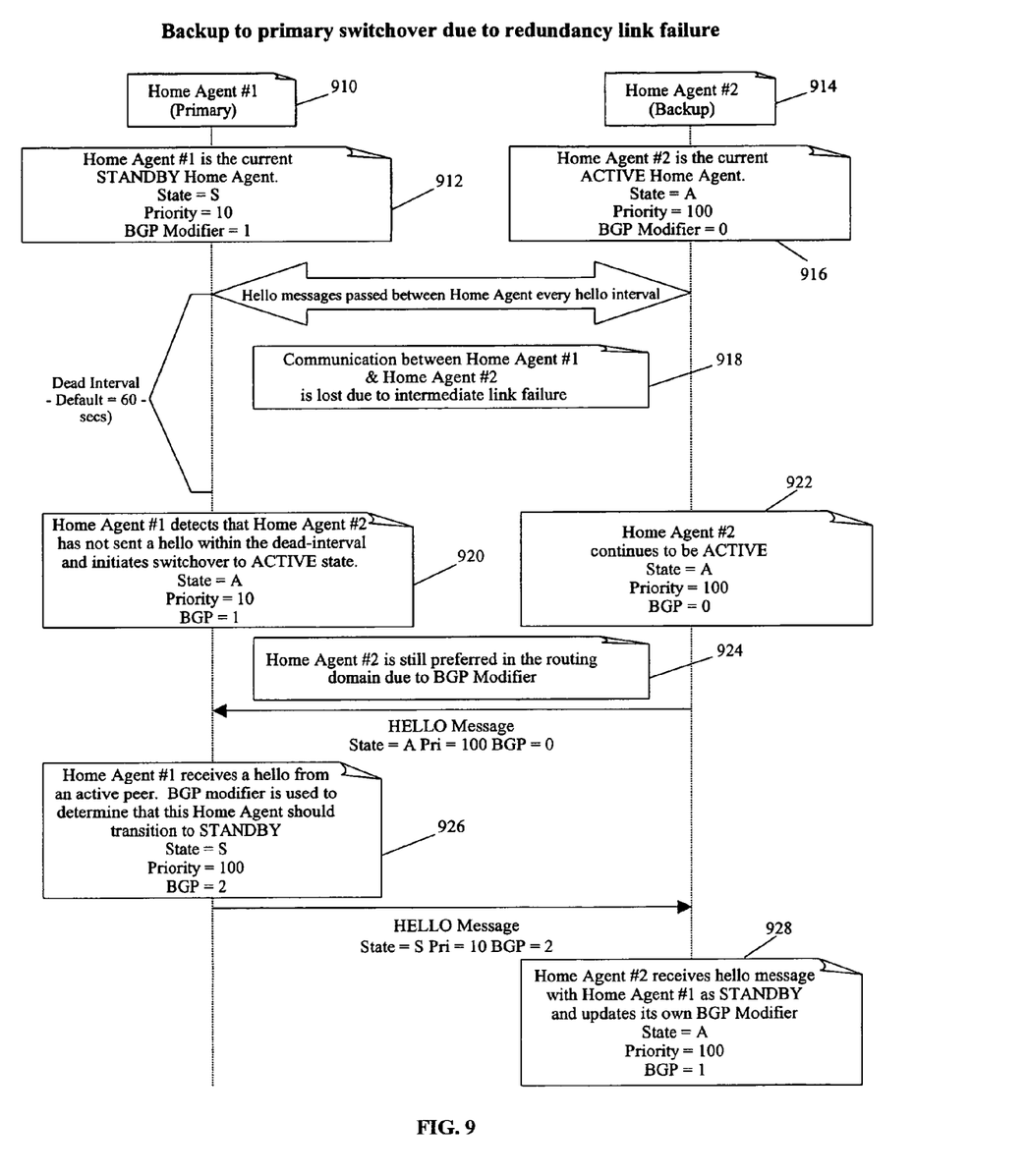
FIG. 9 is a schematic diagram illustrating a backup to primary switchover due to a redundancy link failure in accordance with certain embodiments of the present invention.

FIG. 9 illustrates a backup Home Agent to a primary Home Agent switchover due to a redundancy link failure in accordance with certain embodiments of the present invention. As shown in this example, a Home Agent #1 910 is in the Standby state in step 912 and a Home Agent #2 914 is in the Active state in step 916. Hello Messages may be passed between the Home Agents at regular intervals until communication between Home Agent #1 910 and Home Agent #2 914 is lost due to a link failure in step 918. Home Agent #1 910 detects that Home Agent #2 914 has not sent a Hello Message within the dead-interval, and may initiate a switchover to an Active state in step 920. At the same time, Home Agent #2 914 continues to be Active in step 922.

In certain embodiments of the invention, Home Agent #2 914 remains the preferred Home Agent in the routing domain because the BGP modifier advertised in the network is lower with Home Agent #2 914 than with Home Agent #1 910. In other embodiments, Home Agent #1 910 may become the preferred Home Agent upon switching to Active when the link goes down. In step 926, when Home Agent #1 910 receives a Hello Message from Home Agent #2 914, the BGP modifier may be used to determine which Home Agent should transition to Standby. In this example, Home Agent #1 910 transitions back to Standby because Home Agent #2 914 is still preferred in the routing domain. After transitioning to Standby, Home Agent #1 910 sends a Hello Message to Home Agent #2 914. Home Agent #2 914 receives the Hello Message which includes information that Home Agent #1 910 transitioned to a Standby state. Home Agent #2 914 may update its own BGP modifier if needed in step 928.

Figure 10:
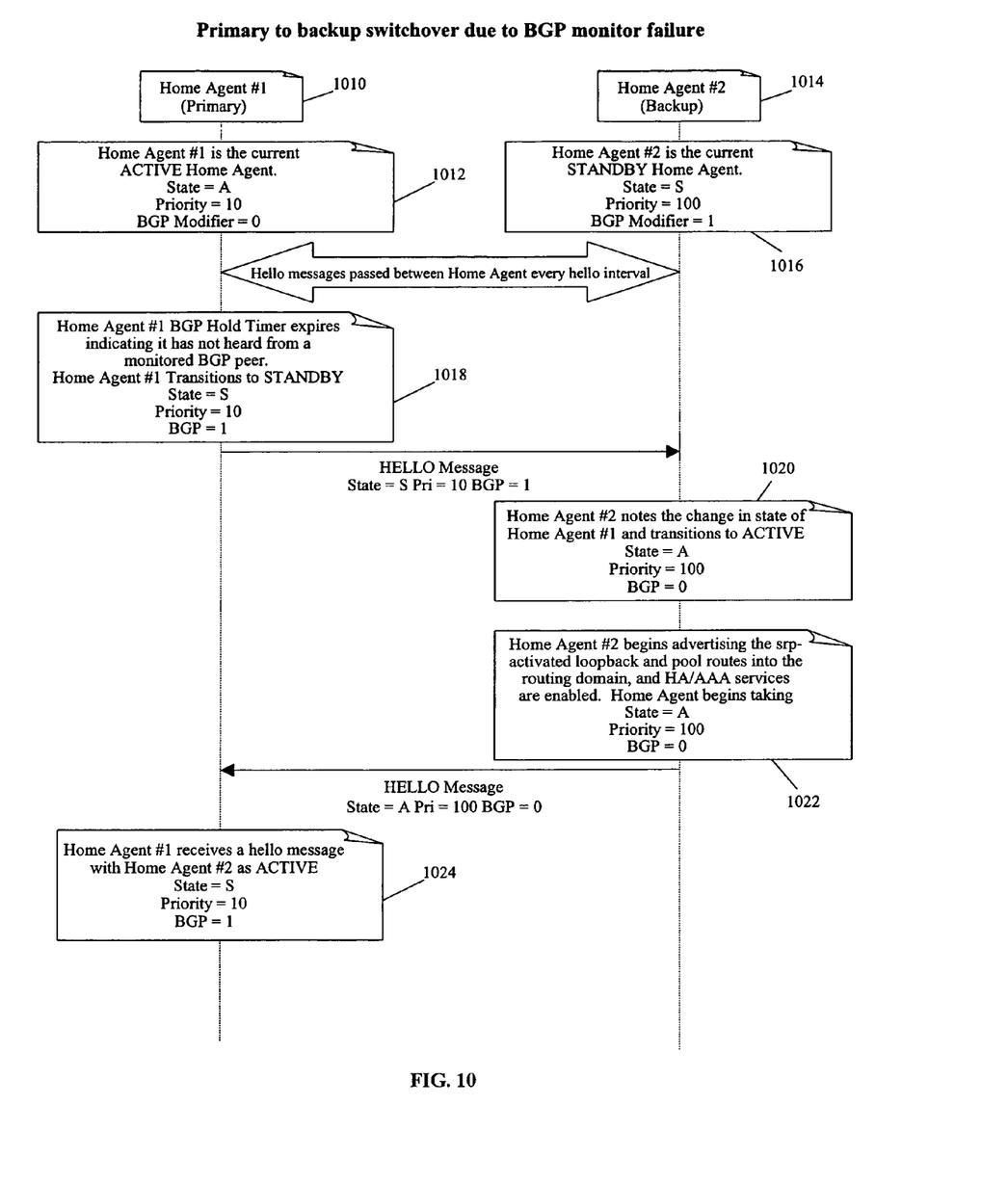
FIG. 10 is a schematic diagram illustrating a primary to backup switchover due to a BGP monitor failure in accordance with certain embodiments of the present invention.

FIG. 10 illustrates a primary Home Agent to a backup Home Agent switchover due to a BGP monitor failure in accordance with certain embodiments of the present invention. As shown in this example, a Home Agent #1 1010 is in the Active state in step 1012 and a Home Agent #2 1014 is in the Standby state at step 1016. Hello Messages may be passed between the Home Agents at regular intervals. In certain embodiments, the Home Agents check BGP router 112 (as shown in FIG. 1) to ensure that it is still functioning. In step 1018, Home Agent #1 1010 checks the BGP router and finds it is not functioning. The checking mechanism may be a timer which resets after receiving a packet and monitors traffic sent from the BGP router. In this case, if the timer reaches a predetermined value without seeing traffic from the BGP router, the BGP router is suspected to be inactive or in a failure mode. Home Agent #1 1010 may transition to Standby to give Home Agent #2 1014 a chance at functioning in the network. To initiate Home Agent #2 1014 transitioning to an Active state, Home Agent #1 1010 sends a Hello Message to Home Agent #2 1014. Home Agent #2 1014 receives the Hello Message, which includes such attributes as: current state information, priority information, and BGP routing information, and in response, transitions to an Active state in step 1020. Home Agent #2 1014 then begins advertising the loopback and pool routes into the routing domain so it can begin taking calls in step 1022. Home Agent #2 1014 may send Home Agent #1 1012 a Hello Message which reinforces that Home Agent #1 1010 will remain in the Standby state in step 1024.

Figure 11:
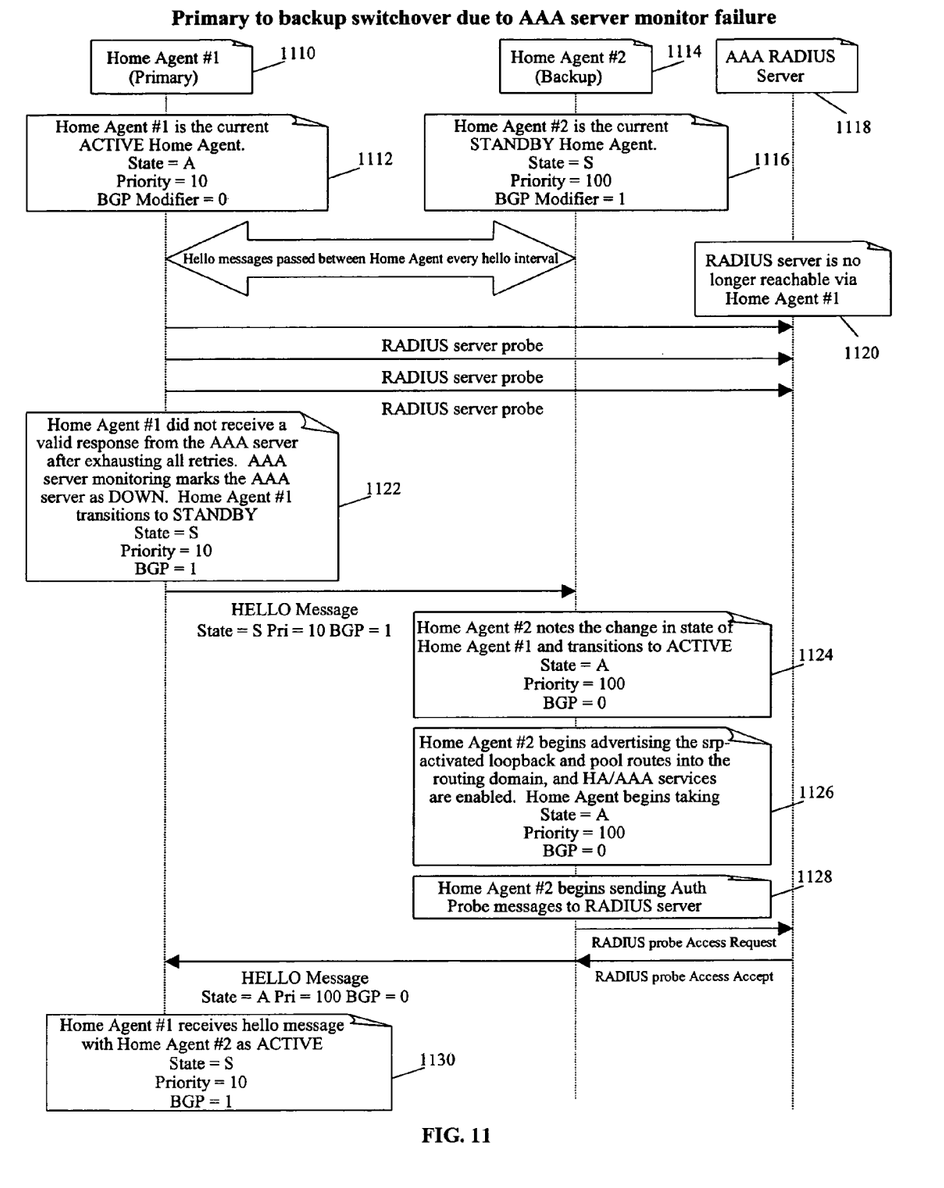
FIG. 11 is a schematic diagram illustrating a primary to backup switchover due to an AAA server monitor failure in accordance with certain embodiments of the present invention.

FIG. 11 illustrates a primary Home Agent to backup Home Agent switchover due to an AAA server monitor failure in accordance with certain embodiments of the invention. As shown in this example, a Home Agent #1 1110 is in the Active state in step 1112 and a Home Agent #2 1114 is in the Standby state in step 1116. The two Home Agents may trade Hello Messages at regular intervals for some time until an AAA RADIUS Server 1118 is no longer reachable by Home Agent #1 1110 in step 1120. Home Agent #1 1110 may continue to send out a number of RADIUS server probes that check the status of AAA RADIUS Server 1118. In certain embodiments a predefined number of attempts may be specified, while in other embodiments a dead-interval may be specified. If Home Agent #1 1110 does not receive a valid response from the AAA server after trying according to the selected, predetermined method, Home Agent #1 1110 may transition to Standby in step 1122.

As shown, if Home Agent #1 1110 transitions to Standby, a Hello Message is received by Home Agent #2 1114 from Home Agent #1 1110 noting the change in state and BGP modifier. Home Agent #1 1110 may include an AAA server monitoring mechanism which marks AAA RADIUS Server 1118 as down after the Home Agent #1 1110 exhausted a specified number of tries to reach the AAA RADIUS Server. This AAA server monitoring mechanism may update the BGP modifier if the mechanism detects that the AAA server is down. A Hello Message prompting Home Agent #2 1114 to transition to an Active state is sent from Home Agent #1 1110 in step 1124. Home Agent #2 1114, in step 1126, begins advertising identification information, which may include IP loopback and pool routes, into the routing domain and enables AAA services so that calls can be taken. In step 1128, Home Agent #2 1114 begins sending authorization probe message to the AAA RADIUS server. In certain embodiments, if the RADIUS probe message is accepted, Home Agent #2 1114 may send a Hello Message to Home Agent #1 1110 to confirm Home Agent #1 1110 can remain in Standby in step 1130. In other embodiments, the Hello Message from Home Agent #2 1114 may be sent, after a period of time which is predetermined, to Home Agent #1 to confirm Home Agent #2 is still operational and Active.

Other embodiments, extensions, and modifications of the embodiments presented above are within the understanding of one versed in the art upon reviewing the present disclosure. Accordingly, the scope of the present invention in its various aspects should not be limited by the examples presented above. The individual aspects of the present invention, and the entirety of the invention should be regarded so as to allow for design modifications and future developments within the scope of the present disclosure.

What is claimed is:

1. A system for providing redundancy in a communication network comprising:
a first Home Agent acting as a backup Home Agent to a primary Home Agent, wherein the primary Home Agent provides mobility management functions for a plurality of mobile nodes and maintains a subscriber session for each mobile node processed by the primary Home Agent;
the first Home Agent configured to receive a Hello Message from the primary Home Agent that is remotely located from the first Home Agent, wherein the Hello Message includes system attributes and information to determine a remote Home Agent's state;
the first Home Agent configured to receive at least one Checkpoint Message from the second Home Agent which provides information for a plurality of subscriber sessions where each subscriber session includes information for a particular mobile node that is used by the primary Home Agent in providing mobility management for that mobile node; and
the first Home Agent being able to transition to become the primary Home Agent to provide mobility management for the plurality of mobile nodes using redundant subscriber session information received from the primary Home Agent and to advertise primary Home Agent identification information into the routing domain using a routing protocol, which prompts network devices to route messages to the first Home Agent instead of the primary Home Agent;
wherein the first Home Agent transitions to the primary Home Agent based on priority and state information in the Hello Message, wherein priority information is used to determine which Home Agent transitions to active.

2. The system of claim 1, further comprising a communication link coupling the first and primary Home Agent as a redundancy link.

3. The system of claim 1, wherein the Hello Message and the Checkpoint Message are formatted in accordance with a Transfer Control Protocol (TCP) based networking protocol.

4. The system of claim 1, wherein the system attributes of the Hello Message include Home Agent state, Priority, and BGP modifier.

5. The system of claim 1, wherein the second Home Agent, after transitioning to the primary Home Agent, advertises IP pool information of the first Home Agent.

6. The system of claim 1, wherein the advertising of information includes the advertising of loopback interface routes, where loopback interface routes are performed using a dynamic routing protocol in an IP routing domain.

7. A method for providing redundancy in a communication network comprising:
   receiving a first message containing system attributes from a first Home Agent at a second Home Agent that is remotely located from the first Home Agent;
   receiving a second message from the first Home Agent acting as a primary Home Agent at the second Home Agent, wherein the second message provides information for a plurality of subscriber sessions where each subscriber session includes information for a particular mobile node that is used by the primary Home Agent in providing services to that mobile node;
   transitioning the second Home Agent to the primary Home Agent;
   processing subscriber sessions at the second Home Agent using the subscriber session information received in the second message; and
   advertising primary Home Agent identification information from the second Home Agent into the routing domain using a routing protocol, which prompts network devices to route messages to the second Home Agent instead of the first Home Agent;
   wherein the transitioning step is based on priority and state information in the first message, and wherein the first message is a Hello Message and the priority information is used to determine which Home Agent transitions to active.

8. The method of claim 7, wherein the communication occurs through a redundancy link.

9. The method of claim 7, further comprising receiving the first message and the second message using a Transfer Control Protocol (TCP) based networking protocol.

10. The method of claim 7, wherein the system attributes of the first message include Home Agent state, Priority, and BGP modifier.

11. The method of claim 7, further comprising advertising loopback interface routes and IP pool information of the first Home Agent after the second Home Agent transitions to the primary Home Agent.

12. The method of claim 7, wherein the advertising of loopback interface routes is performed using a dynamic routing protocol in an IP routing domain.

13. A system for providing redundancy in a communication network comprising:
   a first means for providing backup redundancy for a second means for providing mobility management functions for IP communications on behalf of a mobile node that is remotely located from the first means;
   a means for communicating between the first means and the second means;
   the first means receiving a first message from the second means, the first message containing system attributes; and
   the first means receiving a second message from the second means providing information for a plurality of subscriber sessions where each subscriber session includes information for a particular mobile node that is used by the second means in providing mobility management for that mobile node, wherein the first means transitions to become the primary means for providing mobility management and advertises the identification information of the primary means into the routing domain using a routing protocol;
   wherein the first means transitions to the primary Home Agent based on priority and state information in the Hello Message, and the priority information is used to determine which Home Agent transitions to active.

14. The system of claim 13, wherein the communication means is a redundancy link.

15. The system of claim 13, wherein the first message is a Hello Message and the second message is a Service Checkpoint Message, which are formatted according to a Transfer Control Protocol (TCP) based networking protocol.

16. The system of claim 13, wherein the system attributes of the Hello Message include Home Agent state, Priority, and BGP modifier.

17. The system of claim 13, wherein the second means after transitioning to the primary Home Agent advertises loopback interface routes and IP pool information of the first means through the communication means.

18. The system of claim 13, wherein the advertising of loopback interface routes is performed using a dynamic routing protocol in an IP routing domain.

* * * * *